(12) United States Patent
Rupp et al.

(10) Patent No.: US 12,151,937 B2
(45) Date of Patent: Nov. 26, 2024

(54) HYDROGEN PRODUCTION METHODS AND RELATED SYSTEMS AND COMPOSITIONS

(71) Applicant: Palo Alto Research Center Incorporated, Palo Alto, CA (US)

(72) Inventors: Bradley Rupp, San Francisco, CA (US); Mary Louie, Menlo Park, CA (US); Jin Ki Hong, Palo Alto, CA (US); Dane Boysen, Anchorage, AK (US)

(73) Assignee: Xerox Corporation, Norwalk, CT (US)

( * ) Notice: Subject to any disclaimer, the term of this patent is extended or adjusted under 35 U.S.C. 154(b) by 254 days.

(21) Appl. No.: 17/852,176

(22) Filed: Jun. 28, 2022

(65) Prior Publication Data

US 2023/0416082 A1    Dec. 28, 2023

(51) Int. Cl.
  *C01B 3/26* (2006.01)
  *B01J 21/18* (2006.01)
  *B01J 23/06* (2006.01)
  *B01J 35/23* (2024.01)

(52) U.S. Cl.
  CPC .......... *C01B 3/26* (2013.01); *B01J 21/18* (2013.01); *B01J 23/06* (2013.01); *B01J 35/23* (2024.01); *C01B 2203/0277* (2013.01); *C01B 2203/1005* (2013.01); *C01B 2203/1076* (2013.01)

(58) Field of Classification Search
  None
  See application file for complete search history.

(56) References Cited

FOREIGN PATENT DOCUMENTS

CN    102294255 A    * 12/2011

OTHER PUBLICATIONS

CN-102294255-A, English translation (Year: 2011).*

* cited by examiner

*Primary Examiner* — Stefanie J Cohen
(74) *Attorney, Agent, or Firm* — Vorys, Sater, Seymour and Pease LLP

(57) ABSTRACT

A method of producing hydrogen may include: providing a catalyst-carbon gel; and flowing a hydrocarbon through a catalyst, wherein catalyst is a metal or mixture of metals that is non-wetting to solid carbon at 1 bar absolute and 10° C. above a melting point of the metal or mixture of metals.

15 Claims, 2 Drawing Sheets

HYDROGEN PRODUCTION METHODS AND RELATED SYSTEMS AND COMPOSITIONS

STATEMENT REGARDING FEDERALLY SPONSORED RESEARCH AND DEVELOPMENT

This invention was made with Government support under Award Number DE-AR0001047 awarded by the U.S. Department of Energy's Advanced Research Projects Agency-Energy. The Government has certain rights in this invention.

FIELD OF INVENTION

The present disclosure relates to hydrogen production methods and related systems and compositions.

BACKGROUND

Hydrogen as a fuel source has increasing interest due to hydrogen's potential advantages over hydrocarbon fuels including clean combustion characteristics and higher calorific value. Hydrogen may be commercially produced by a number of different methods, such as electrolysis, steam methane reforming, auto thermal reforming, partial oxidation reforming, extensions of these processes and the like. For example, steam methane reforming (SMR) proceeds via a $CH_4 + 2\,H_2O \rightarrow CO_2 + 4\,H_2$ reaction. SMR makes about 95% of hydrogen produced globally but contributes almost 4% of all $CO_2$ output annually.

Alternative methods using methane pyrolysis via a $CH_4 \rightarrow C_{(s)} + 2\,H_2$ reaction have been developed but do not compete economically with SMR. For example, plasma-based reactors use a high temperature plasma to thermally crack the methane to produce hydrogen and solid carbon. A drawback to plasma-based reactors is the energy requirements to produce the plasma. This results in high electricity usage, and thus high operating costs.

Another alternative method is hydrolysis to split water to make oxygen and hydrogen. As with other SMR alternatives, hydrolysis methods are very energy-intensive. Alternative avenues for producing hydrogen with less carbon dioxide emissions and approachable economics are needed.

SUMMARY OF INVENTION

The present disclosure relates to hydrogen production methods and related systems and compositions.

A nonlimiting example embodiment of the present disclosure is a method comprising: providing a catalyst-carbon gel; and flowing a hydrocarbon through the catalyst-carbon gel, wherein a catalyst of the catalyst-carbon gel is a metal or mixture of metals that is non-wetting to solid carbon at 1 bar absolute and 10° C. above a melting point of the metal or mixture of metals.

Another nonlimiting example embodiment of the present disclosure is a method comprising: flowing a hydrocarbon through a catalyst that is a metal or mixture of metals that is non-wetting to solid carbon at 1 bar absolute and 10° C. above a melting point of the metal or mixture of metals; entraining gaseous and/or liquid catalyst with the hydrocarbon; condensing and/or depositing the gaseous and/or liquid catalyst downstream of the catalyst; and pyrolyzing at least a portion of the hydrocarbon; thereby forming a catalyst-carbon gel.

Another nonlimiting example embodiment of the present disclosure is catalyst-carbon gel comprising: a plurality of catalyst particles at least partially coated with a solid carbon coating; and solid carbon not contacting portions of the plurality of catalyst particles and not being part of the solid carbon coating, wherein a catalyst of the plurality of catalyst particles is a metal or mixture of metals that is non-wetting to solid carbon at 1 bar absolute and 10° C. above a melting point of the metal or mixture of metal.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
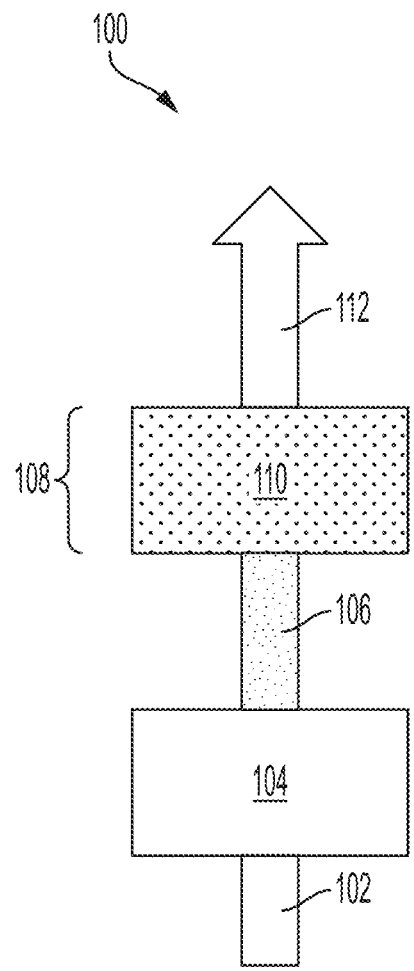
FIG. 1 illustrates a nonlimiting example method of the present disclosure.

The present disclosure relates to hydrogen production methods and related systems and compositions. More specifically, the present disclosure includes methane pyrolysis methods to produce hydrogen and solid carbon using a catalyst-carbon gel. Advantageously, the catalyst-carbon gel may have a higher catalytic activity for methane pyrolysis than the catalyst (e.g., a molten metal like zinc) alone.

Without being limited by theory, molten catalysts (e.g., a molten metal like zinc) may be non-wetting to solid carbon. As a result, and because said molten catalyst is relatively viscous, as the carbon production continues due to the pyrolysis reaction occurring during flowing (e.g., bubbling) of hydrocarbon like methane through a molten catalyst, the solid carbon cannot easily flow through the molten catalyst. This causes carbon to stay with the molten catalyst for longer and aggregate with other carbon particles. These carbon particles are also catalytically active and further drive methane conversion to hydrogen and more solid carbon. As the carbon concentration increases, the carbon phase and molten catalyst phase undergoes a phase inversion where the molten catalyst phase becomes dispersed in a carbon phase (or carbon network). As a result, a high surface area bed, or catalyst-carbon gel, forms that comprises (a) a plurality of catalyst particles at least partially coated with a solid carbon coating and (b) solid carbon not contacting portions of the plurality of catalyst particles and not being part of the solid carbon coating. This catalyst-carbon gel may be highly catalytically active compared to just the molten catalyst itself, which may be due, at least in part, to the increased surface area of the catalyst particles.

This catalyst-carbon gel formation process may occur in downstream portions of the molten catalyst (e.g., in a molten catalyst reservoir) and/or downstream and separate from the molten catalyst where high carbon to catalyst ratios may be achieved. When catalyst-carbon gel formation occurs downstream and separate from the molten catalyst, the molten catalyst of the catalyst-carbon gel may be provided by entraining some of the molten catalyst from the molten catalyst in the hydrocarbon flowing through the molten catalyst. Said entrained catalyst may then be deposited downstream and separate from the molten catalyst. Said deposited metal may then produce solid carbon via pyrolysis and, after a high enough solid carbon concentration is reached, form the catalyst-carbon gel.

Furthermore, the catalyst-carbon gel may be loosely held together where simple agitation of the catalyst-carbon gel may cause the carbon and catalyst phases to separate. This may allow for straightforward carbon separation and catalyst regeneration. The catalyst-carbon gel may then be reformed in the system under pyrolysis reaction conditions to efficiently produce hydrogen.

The catalyst may be a metal or mixture of metals that is non-wetting to solid carbon at 1 bar absolute pressure and 10° C. above the melting point of the metal or mixture of metal. 10° C. above the melting point of a mixture of metals is 10° C. above the highest melting point metal in the mixture of metals. A non-wetting liquid (molten metal or mixture of metals) creates a contact angle between 90° and 180° with the solid (carbon where graphite may be used for the contact angle measurement) at the given temperature and pressure.

Examples of catalysts may include, but are not limited to, potassium, sodium, selenium, cadmium, zinc, magnesium, the like, and any combination thereof.

Examples of hydrocarbons may include, but are not limited to, methane, ethane, propane, the like, and any combination thereof.

As described above, the catalyst-carbon gel of the present disclosure forms when a solid carbon concentration is high enough to produce a composition that comprises catalyst particles in a carbon matrix. The catalyst particles are molten at a temperatures above the melting point of the catalyst. The carbon of that carbon matrix may be at least partially coating the catalyst particles as well as separate from the catalyst particles. Therefore, the catalyst-carbon gel of the present disclosure may comprise (a) a plurality of catalyst particles at least partially coated with a solid carbon coating and (b) solid carbon not contacting portions of the plurality of catalyst particles and not being part of the solid carbon coating.

Preferably, the catalyst particles (or molten catalyst particles) have a small size and, therefore, high surface area. For example, the catalyst particles (or molten catalyst particles) may have a D90 of about 10 µm or less (or about 1 µm to about 10 µm, or about 1 µm to about 5 µm, or about 3 µm to about 7 µm, or about 5 µm to about 10 µm). The catalyst particles (or molten catalyst particles) may have a D10 of about 0.1 µm or more (or about 0.1 µm to about 5 µm, or about 0.1 µm to about 1 µm, or about 0.5 µm to about 2 µm, or about 1 µm to about 5 µm). The catalyst particles (or molten catalyst particles) may have a D90 of about 10 µm or less (or about 1 µm to about 10 µm, or about 1 µm to about 5 µm, or about 3 µm to about 7 µm, or about 5 µm to about 10 µm) and a D10 of about 0.1 µm or more (or about 0.1 µm to about 5 µm, or about 0.1 µm to about 1 µm, or about 0.5 µm to about 2 µm, or about 1 µm to about 5 µm).

The size of the molten catalyst particles may be ascertained by cooling the catalyst-carbon gel to cause the molten catalyst to solidify, removing the solid catalyst, performing scanning electron micrograph (SEM) imaging of the remaining carbon structure, measuring the diameter of at least 500 carbon shells (described further herein) in the SEM images, and calculating a particle size characteristic (e.g., D90 and/or D10). As illustrated in the examples, a carbon shell, which was the carbon coating in the catalyst-carbon gel, remains behind after removal of the solid catalyst. Removal of the catalyst in the foregoing method may be achieved by dissolving said catalyst in a solvent like a strong base or boiling off the low boiling point liquid catalyst.

The solid carbon coating on the catalyst particles (or molten catalyst particles) of the catalyst-carbon gel may be about 1 layer to 1000s of layers or more (or about 1 layer to about 5000 layers, or about 1 layer to about 25 layers, or about 5 layers to about 50 layers, or about 25 layers to about 100 layers, or about 50 layers to about 500 layers, or about 250 layers to about 1000 layers, or about 500 layers to about 5000 layers or more) of carbon thick. They number of layers may be ascertained by cooling the catalyst-carbon gel where SEM images may be used to estimate the thickness of the carbon shells and derive the number of carbon layers thick using the assumption that the carbon shells have a thickness and spacing of graphite. The solid carbon coating on the catalyst particles (or molten catalyst particles) of the catalyst-carbon gel may be about 1 layer to about 10 µm or more (or about 1 layer to about 500 layers, or about 0.5 µm to about 2 µm, or about 1 µm to about 5 µm or about 2 µm to about 10 µm or more).

The carbon to catalyst mass ratio of the catalyst-carbon gel, which may be ascertained by cooling the catalyst-carbon gel, may be about 1:1000 to about 1:1 (or about 1:1000 to about 1:250, or about 1:500 to about 1:100, or about 1:250 to about 1:25, or about 1:50 to about 1:1, or about 1:30 to about 1:1).

The carbon to catalyst volume ratio of the catalyst-carbon gel, which may be ascertained by cooling the catalyst-carbon gel, may be about 1:4 to about 2:1 (or about 1:4 to about 1:2, or about 1:3 to about 1:1, or about 1:2 to about 2:1).

The porosity of the catalyst-carbon gel, which may be ascertained by cooling the catalyst-carbon gel, may be about 30% to about 80% or more (or about 30% to about 60%, or about 50% to about 70%, or about 60% to about 80% or more). Porosity is $100*(1-(d_a/d_m))$ where $d_a$ is the apparent density of the catalyst-carbon gel and $d_m$ is the density of a material having the same catalyst and carbon composition (that is, the same mass ratio of catalyst to carbon) but with zero porosity.

The catalyst-carbon gel may form when a carbon concentration is sufficiently high to cause the molten catalyst to form particles that are at least partially coated with solid carbon. This may be in downstream portions of the molten catalyst (e.g., in a molten catalyst reservoir) and/or may be separate from the molten catalyst and downstream of the molten catalyst. Methods for forming the catalyst-carbon gel may comprise flowing (e.g., bubbling) a hydrocarbon through molten catalyst; pyrolyzing at least a portion of the hydrocarbon to produce solid carbon and hydrogen gas; and building up a solid carbon concentration to a sufficient level to cause molten catalyst to form molten catalyst particles at least partially coated with solid carbon. The actual level of solid carbon may depend on, among other things, temperature, pressure, wetting characteristics between solid carbon and the specific molten catalyst composition, the like, and any combination thereof. Advantageously, forming the catalyst-carbon gel downstream and separate from the molten catalyst may, at least initially, limit the amount of catalyst present and more quickly (as compared to forming in the molten catalyst reservoir) form the molten catalyst particles at least partially coated with solid carbon.

FIG. 1 illustrates a nonlimiting example method 100 of the present disclosure. When catalyst-carbon gel 110 formation occurs downstream and separate from the catalyst 104 (or molten catalyst 104) (e.g., in a catalyst reservoir), the method 100 of formation may include flowing (e.g., bubbling) a hydrocarbon 102 through a catalyst 104. Downstream of the catalyst 104, the stream 106 may comprise hydrocarbon and entrained gaseous and/or liquid catalyst. Then, at least a portion of the gaseous and/or liquid catalyst in the stream 106 may condense and/or deposit at a location 108 downstream and separate from the catalyst 104. Because the pyrolysis reaction is still occurring on said catalyst present at said location 108, solid carbon continues to form at said location 108. Eventually, a catalyst-carbon gel 110 is formed that comprises (a) a plurality of catalyst particles (or molten catalyst particles) at least partially coated with a solid carbon coating and (b) solid carbon not contacting portions (or molten portions) of the plurality of catalyst particles (or molten catalyst particles) and not being part of the solid carbon coating. Once the catalyst-carbon gel 108 is formed, pyrolysis may be occurring in both the catalyst-carbon gel 110 and the catalyst 104.

Whether the catalyst-carbon gel is formed in or at the molten catalyst, downstream and separate from the molten catalyst, or both, the hydrocarbon entering the molten catalyst may have water and oxygen, individually, present at 10 ppm or less (or 1 ppm or less, or 0.1 ppm or less, or not present). For example, the hydrocarbon entering to the molten catalyst may have no water and no oxygen present.

Whether the catalyst-carbon gel is formed in or at the molten catalyst, downstream and separate from the molten catalyst, or both, the hydrocarbon entering to the catalyst-carbon gel may have water and oxygen, individually, present at 10 ppm or less (or 1 ppm or less, or 0.1 ppm or less, or not present). For example, the hydrocarbon entering to the catalyst-carbon gel may have no water and no oxygen present.

Whether the catalyst-carbon gel is formed in or at the molten catalyst, downstream and separate from the molten catalyst, or both, a temperature and pressure of the molten catalyst reservoir should be chosen to maintain a molten catalyst. The pressure at the molten catalyst (e.g., in a molten catalyst reservoir) may be about 1 bar absolute to about 5 bars absolute (or about 1 bar absolute to about 3 bars absolute, or about 2 bars absolute to about 5 bars absolute). A temperature of the molten catalyst (e.g., in a molten catalyst reservoir) may be at the melting point of the catalyst to 10° C. below the boiling point of the catalyst at the given pressure of the molten catalyst reservoir (or at the melting point of the catalyst to about 300° C. greater than the melting point of the catalyst at the given pressure of the molten catalyst, or at the melting point of the catalyst at the given pressure of the molten catalyst to about 100° C. greater than the melting point of the catalyst at the given pressure of the molten catalyst, or about 50° C. greater than the melting point of the catalyst at the given pressure of the molten catalyst to about 200° C. greater than the melting point of the catalyst at the given pressure of the molten catalyst, or about 100° C. greater than the melting point of the catalyst at the given pressure of the molten catalyst to about 300° C. greater than the melting point of the catalyst at the given pressure of the molten catalyst). A temperature of the molten catalyst may be about 750° C. to about 1250° C. (or about 750° C. to about 1250° C., or about 750° C. to about 1250° C., or about 750° C. to about 1250° C.).

Generally, the catalyst-carbon gel is at substantially the pressure (e.g., within 10% of the pressure) of the molten catalyst (e.g., in a molten catalyst reservoir). Therefore, the pressure at the catalyst-carbon gel may be about 1 bar absolute to about 10 bars absolute (or about 1 bar absolute to about 5 bars absolute, or about 3 bars absolute to about 7 bars absolute, or about 5 bars absolute to about 10 bars absolute). Whether the catalyst-carbon gel is formed in or at the molten catalyst, downstream and separate from the molten catalyst, or both, a temperature of the catalyst-carbon gel may be at the melting point of the catalyst to 10° C. below the boiling point of the catalyst at the given pressure of the catalyst-carbon gel (or at the melting point of the catalyst to about 300° C. greater than the melting point of the catalyst at the given pressure of the catalyst-carbon gel, or at the melting point of the catalyst at the given pressure of the catalyst-carbon gel to about 100° C. greater than the melting point of the catalyst at the given pressure of the catalyst-carbon gel, or about 50° C. greater than the melting point of the catalyst at the given pressure of the catalyst-carbon gel to about 200° C. greater than the melting point of the catalyst at the given pressure of the catalyst-carbon gel, or about 100° C. greater than the melting point of the catalyst at the given pressure of the catalyst-carbon gel to about 300° C. greater than the melting point of the catalyst at the given pressure of the catalyst-carbon gel). A temperature of the catalyst-carbon gel may be about 750° C. to about 1250° C. (or about 750° C. to about 1250° C., or about 750° C. to about 1250° C., or about 750° C. to about 1250° C.).

Whether the catalyst-carbon gel is formed in or at the molten catalyst, downstream and separate from the molten catalyst, or both, the hydrocarbon flow rate into the molten catalyst (e.g., in a molten catalyst reservoir) may, for example, be at a value sufficient to provide at a linear velocity of hydrocarbon flow immediately downstream of the molten catalyst of about 0.1 cm/s to about 1 m/s (or about 0.1 cm/s to about 10 cm/s, or about 5 cm/s to about 50 cm/s, or about 25 cm/s to about 1 m/s).

Components present in the gas stream downstream of the catalyst-carbon gel include one or more of: the gaseous and/or liquid catalyst that does not condense and/or deposit in the catalyst-carbon gel, unreacted hydrocarbon, and hydrogen. Therefore, methods described herein may further include separating at least one of the components from the gas stream downstream of the catalyst-carbon gel. For example, methods may include, downstream of the catalyst-carbon gel, separating the gaseous and/or liquid catalyst that does not condense and/or deposit in the catalyst-carbon gel from the hydrogen.

The captured gaseous and/or liquid catalyst that does not condense and/or deposit in the catalyst-carbon gel may optionally be recycled back to the molten catalyst.

To regenerate the catalyst, the solid carbon may be separated from the molten catalyst. Advantageously, because the solid carbon does not wet the molten catalyst well, the molten catalyst (whether part of the molten catalyst, the catalyst-carbon gel, or both) with solid carbon therein may be mechanically separated (e.g., via filtration, skimming solid carbon from a top of the molten catalyst, or the like). The mechanical separation may be assisted by agitating the molten catalyst with solid carbon therein to cause agglomeration within their respective phases (e.g., to cause the molten metal particles to agglomerate) into larger volumes of each phase (e.g., as compared to lots of small particles).

Alternatively or in addition to removing solid carbon while the catalyst is molten, the molten catalyst and/or the catalyst-carbon gel may be cooled to cause solidification of the catalyst. Then, the catalyst may be chemically removed (e.g., exposure to a strong base) and/or thermally removed.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having the benefit of this disclosure.

While compositions and methods are described herein in terms of "comprising" various components or steps, the compositions and methods can also "consist essentially of" or "consist of" the various components and steps.

Nonlimiting Example Embodiments

A first nonlimiting example embodiment of the present disclosure is a method comprising: a method comprising: providing a catalyst-carbon gel (e.g., comprising (a) a plurality of catalyst particles at least partially coated with a solid carbon coating and (b) solid carbon not contacting portions of the plurality of catalyst particles and not being part of the solid carbon coating); and flowing a hydrocarbon through the catalyst-carbon gel, wherein a catalyst of the catalyst-carbon gel is a metal or mixture of metals that is non-wetting to solid carbon at 1 bar absolute and 10° C. above a melting point of the metal or mixture of metals.

A second nonlimiting example embodiment of the present disclosure is a method comprising: flowing a hydrocarbon through a catalyst that is a metal or mixture of metals that is non-wetting to solid carbon at 1 bar absolute and 10° C. above a melting point of the metal or mixture of metals; entraining gaseous and/or liquid catalyst with the hydrocarbon; condensing and/or depositing the gaseous and/or liquid catalyst downstream of the catalyst; and pyrolyzing at least a portion of the hydrocarbon; thereby forming a catalyst-carbon gel (e.g., comprising (a) a plurality of catalyst particles at least partially coated with a solid carbon coating and (b) solid carbon not contacting portions of the plurality of catalyst particles and not being part of the solid carbon coating).

The first or second nonlimiting example embodiment may further include one or more of: Element 1: wherein the catalyst is a metal or mixture of metals that is non-wetting to solid carbon at 1 bar absolute and 10° C. above a melting point of the metal or mixture of metals; Element 2: wherein the catalyst (or catalyst reservoir) is positioned to receive thermal energy from a heat source; Element 3: wherein the catalyst-carbon gel is downstream and separate from the catalyst (or catalyst reservoir); Element 4: wherein the catalyst-carbon gel and the catalyst (or catalyst reservoir) are in a same vessel; Element 5: wherein the catalyst-carbon gel and the catalyst (or catalyst reservoir) are in separate vessels; Element 6: wherein the hydrocarbon flowing through the catalyst (or catalyst reservoir) has present water and oxygen, individually, at 10 ppm or less; Element 7: wherein when flowing the hydrocarbon through the catalyst (or catalyst reservoir) neither water nor oxygen are present; Element 8: wherein the catalyst is selected from the group consisting of: potassium, sodium, selenium, cadmium, zinc, magnesium, and any combination thereof; Element 9: the method further comprising: downstream of the catalyst-carbon gel separating the gaseous and/or liquid catalyst that does not condense and/or deposit in the catalyst-carbon gel from the hydrogen and unreacted hydrocarbons; Element 10: Element 9 and the method further comprising: recycling the gaseous and/or liquid catalyst separated from the hydrogen to the catalyst (or catalyst reservoir); Element 11: the method further comprising: mechanically removing the solid carbon from the catalyst (or catalyst reservoir) and/or the catalyst-carbon gel; Element 12: the method further comprising: cooling the catalyst (or catalyst reservoir) and/or the catalyst-carbon gel; and chemically and/or thermally removing the catalyst from the solid carbon; Element 13: wherein a temperature of the catalyst (or catalyst reservoir) is at a melting point of the catalyst to 10° C. below a boiling point of the catalyst at a working pressure of the catalyst (or catalyst reservoir); Element 14: wherein a temperature at the catalyst-carbon gel is about 750° C. to about 1250° C. and a pressure at the catalyst-carbon gel is about 1 bar absolute to about 10 bars absolute; Element 15: wherein the hydrocarbon is flowing into the catalyst (or catalyst reservoir) at a flow rate sufficient to achieve at a linear velocity immediately downstream of the catalyst (or catalyst reservoir) of about 0.1 cm/s to about 1 m/s; Element 16: wherein the catalyst particles of the catalyst-carbon gel have a D90 of about 10 μm or less; Element 17: wherein the catalyst particles of the catalyst-carbon gel have a D10 of about 0.1 μm or more; Element 18: wherein the hydrocarbon comprises methane; Element 19: wherein a carbon to catalyst mass ratio of the catalyst-carbon gel is about 1:1000 to about 1:1; Element 20: wherein a carbon to catalyst volume ratio of the catalyst-carbon gel is about 1:4 to about 2:1; and Element 21: wherein a porosity of the catalyst-carbon gel is about 30% to about 80%. Examples of combinations include, but are not limited to, Element 1 in combination with one or more of Elements 2-21; Element 2 in combination with one or more of Elements 3-21; Element 3 in combination with one or more of Elements 4-21; Element 4 and 5 in combination where more than one gel is present; Element 4 in combination with one or more of Elements 5-21; Element 5 in combination with one or more of Elements 6-21; Element 6 in combination with one or more of Elements 7-21; Element 7 in combination with one or more of Elements 8-21; Element 8 in combination with one or more of Elements 9-21; Element 9 in combination with one or more of Elements 10-21; Element 10 in combination with one or more of Elements 11-21; Element 11 in combination with one or more of Elements 12-21; Element 12 in combination with one or more of Elements 13-21; Element 13 in combination with one or more of Elements 14-21; Element 14 in combination with one or more of Elements 15-21; Element in combination with one or more of Elements 16-21; Element 16 in combination with one or more of Elements 17-21; Element 17 in combination with one or more of Elements 18-21; and two or more of Elements 18-21 in combination.

A third nonlimiting example embodiment of the present disclosure is a method comprising: providing a catalyst-carbon gel (e.g., comprising (a) a plurality of molten catalyst particles at least partially coated with a solid carbon coating and (b) solid carbon not contacting molten portions of the plurality of molten catalyst particles and not being part of the solid carbon coating); and flowing a hydrocarbon through the catalyst-carbon gel, wherein a catalyst of the catalyst-carbon gel is a metal or mixture of metals that is non-wetting to solid carbon at 1 bar absolute and 10° C. above a melting point of the metal or mixture of metals.

A fourth nonlimiting example embodiment of the present disclosure is a method comprising: flowing a hydrocarbon through a molten catalyst, wherein a catalyst of the molten catalyst is a metal or mixture of metals that is non-wetting to solid carbon at 1 bar absolute and above a melting point of the metal or mixture of metals; entraining gaseous and/or liquid catalyst with the hydrocarbon; condensing and/or depositing the gaseous and/or liquid catalyst downstream of the molten catalyst; and pyrolyzing at least a portion of the hydrocarbon; thereby forming a catalyst-carbon gel (e.g., comprising (a) a plurality of molten catalyst particles at least partially coated with a solid carbon coating and (b) solid carbon not contacting molten portions of the plurality of molten catalyst particles and not being part of the solid carbon coating). Said steps flowing, entraining, condensing and/or depositing, and pyrolyzing may occur simultaneous. Further, flowing may begin before entraining, condensing and/or depositing, and pyrolyzing. Further, flowing and pyrolyzing may begin before entraining and condensing and/or depositing. Further, pyrolyzing may occur during any of the steps where conditions are sufficient pyrolyze the hydrocarbon. Additional order of steps and simultaneous step combinations are also contemplated.

A fifth nonlimiting example embodiment of the present disclosure is a method comprising: flowing a hydrocarbon through a molten catalyst reservoir; entraining gaseous and/or liquid catalyst with the hydrocarbon; condensing and/or depositing the gaseous and/or liquid catalyst downstream of the molten catalyst reservoir; forming a catalyst-carbon gel comprising (a) a plurality of molten catalyst particles at least partially coated with a solid carbon coating and (b) solid carbon not contacting molten portions of the plurality of molten catalyst particles and not being part of the solid carbon coating; flowing the hydrocarbon through the catalyst-carbon gel; and pyrolyzing at least a portion of the hydrocarbon flowing through the molten catalyst reservoir and at least a portion of the hydrocarbon flowing through the catalyst-carbon gel to produce hydrogen gas. Said steps flowing, entraining, condensing and/or depositing, forming, flowing, and pyrolyzing may occur simultaneous. Further, flowing of the hydrocarbon through the molten catalyst reservoir may begin before entraining, condensing and/or depositing, forming, and pyrolyzing. Further, ng of the hydrocarbon through the molten catalyst reservoir and pyrolyzing may begin before entraining, condensing and/or depositing, and forming. Further, pyrolyzing may occur during any of the steps where conditions are sufficient pyrolyze the hydrocarbon. Additional order of steps and simultaneous step combinations are also contemplated.

The third, fourth, or fifth nonlimiting example embodiment may further include one or more of: Element 1: wherein a catalyst of the molten catalyst (or molten catalyst reservoir) is a metal or mixture of metals that is non-wetting to solid carbon at 1 bar absolute and 10° C. above a melting point of the metal or mixture of metals; Element 2: wherein the molten catalyst (or molten catalyst reservoir) is positioned to receive thermal energy from a heat source; Element 3: wherein the catalyst-carbon gel is downstream and separate from the molten catalyst (or molten catalyst reservoir); Element 4: wherein the catalyst-carbon gel and the molten catalyst (or molten catalyst reservoir) are in a same vessel; Element 5: wherein the catalyst-carbon gel and the molten catalyst (or molten catalyst reservoir) are in separate vessels; Element 6: wherein the hydrocarbon flowing through the molten catalyst (or molten catalyst reservoir) has present water and oxygen, individually, at 10 ppm or less; Element 7: wherein when flowing the hydrocarbon through the molten catalyst (or molten catalyst reservoir) neither water nor oxygen are present; Element 8: wherein the catalyst is selected from the group consisting of: potassium, sodium, selenium, cadmium, zinc, magnesium, and any combination thereof; Element 9: the method further comprising: downstream of the catalyst-carbon gel separating the gaseous and/or liquid catalyst that does not condense and/or deposit in the catalyst-carbon gel from the hydrogen and unreacted hydrocarbons; Element 10: Element 9 and the method further comprising: recycling the gaseous and/or liquid catalyst separated from the hydrogen to the molten catalyst (or molten catalyst reservoir); Element 11: the method further comprising: mechanically removing the solid carbon from the molten catalyst (or molten catalyst reservoir) and/or the catalyst-carbon gel; Element 12: the method further comprising: cooling the molten catalyst (or molten catalyst reservoir) and/or the catalyst-carbon gel; and chemically and/or thermally removing the catalyst from the solid carbon; Element 13: wherein a temperature of the molten catalyst (or molten catalyst reservoir) is at a melting point of the catalyst to 10° C. below a boiling point of the catalyst at a working pressure of the molten catalyst (or molten catalyst reservoir); Element 14: wherein a temperature at the catalyst-carbon gel is about 750° C. to about 1250° C. and a pressure at the catalyst-carbon gel is about 1 bar absolute to about 10 bars absolute; Element 15: wherein the hydrocarbon is flowing into the molten catalyst (or molten catalyst reservoir) at a flow rate sufficient to achieve at a linear velocity immediately downstream of the molten catalyst (or molten catalyst reservoir) of about 0.1 cm/s to about 1 m/s; Element 16: wherein the molten catalyst particles of the catalyst-carbon gel have a D90 of about 10 μm or less; Element 17: wherein the molten catalyst particles of the catalyst-carbon gel have a D10 of about 0.1 μm or more; Element 18: wherein the hydrocarbon comprises methane; Element 19: wherein a carbon to catalyst mass ratio of the catalyst-carbon gel is about 1:1000 to about 1:1; Element 20: wherein a carbon to catalyst volume ratio of the catalyst-carbon gel is about 1:4 to about 2:1; and Element 21: wherein a porosity of the catalyst-carbon gel is about 30% to about 80%. Examples of combinations include, but are not limited to, Element 1 in combination with one or more of Elements 2-21; Element 2 in combination with one or more of Elements 3-21; Element 3 in combination with one or more of Elements 4-21; Element 4 and 5 in combination where more than one gel is present; Element 4 in combination with one or more of Elements 5-21; Element 5 in combination with one or more of Elements 6-21; Element 6 in combination with one or more of Elements 7-21; Element 7 in combination with one or more of Elements 8-21; Element 8 in combination with one or more of Elements 9-21; Element 9 in combination with one or more of Elements 10-21; Element 10 in combination with one or more of Elements 11-21; Element 11 in combination with one or more of Elements 12-21; Element 12 in combination with one or more of Elements 13-21; Element 13 in combination with one or more of Elements 14-21; Element 14 in combination with one or more of Elements 15-21; Element 15 in combination with one or more of Elements 16-21; Element 16 in combination with one or more of Elements 17-21; Element 17 in combination with one or more of Elements 18-21; and two or more of Elements 18-21 in combination.

A sixth nonlimiting example embodiment of the present disclosure is catalyst-carbon gel comprising: a plurality of catalyst particles (or molten catalyst particles) at least partially coated with a solid carbon coating; and solid carbon not contacting portions of the plurality of catalyst particles and not being part of the solid carbon coating. The second nonlimiting example embodiment may further include one or more of: Element 22: wherein the catalyst is a metal or mixture of metals that is non-wetting to solid carbon at 1 bar absolute and 10° C. above a melting point of the metal or mixture of metals; Element 23: wherein the catalyst particles of the catalyst-carbon gel have a D90 of about 10 μm or less; Element 24: wherein the catalyst particles of the catalyst-carbon gel have a D10 of about 0.1 μm or more; Element 25: wherein the solid carbon coating of the catalyst-carbon gel is about 1 layer of carbon to about 5000 layers of carbon thick; Element 26: wherein a carbon to catalyst mass ratio of the catalyst-carbon gel is about 1:1000 to about 1:1; Element 27: wherein a carbon to catalyst volume ratio of the catalyst-carbon gel is about 1:4 to about 2:1; and Element 28: wherein a porosity of the catalyst-carbon gel is about 30% to about 80%. Examples of combinations include: Element 22 in combination with one or more of Elements 23-28; Element 23 in combination with one or more of Elements 24-28; Element 24 in combination with one or more of Elements 25-28; Element 25 in combination with one or more of Elements 26-28; and two or more of Elements 26-28 in combination.

Clauses

Clause 1. A method comprising: providing a catalyst-carbon gel; and flowing a hydrocarbon through the catalyst-carbon gel under conditions sufficient to pyrolyze the hydrocarbon, wherein the catalyst is a metal or mixture of metals that is non-wetting to solid carbon at 1 bar absolute and 10° C. above a melting point of the metal or mixture of metals.

Clause 2. The method of Clause 1, wherein the catalyst-carbon gel comprises (a) a plurality of catalyst particles at least partially coated with a solid carbon coating and (b) solid carbon not contacting portions of the plurality of catalyst particles and not being part of the solid carbon coating.

Clause 3. The method of Clause 2, wherein the catalyst particles of the catalyst-carbon gel have a D90 of about 10 μm or less.

Clause 4. The method of Clause 2, wherein the catalyst particles of the catalyst-carbon gel have a D10 of about 0.1 μm or more.

Clause 5. The method of Clause 1 further comprising: flowing the hydrocarbon through a second catalyst comprising the catalyst, wherein the second catalyst is upstream of and separate from the catalyst-carbon gel.

Clause 6. The method of Clause 5, wherein the hydrocarbon through the second catalyst is at a flow rate sufficient to achieve at a linear velocity immediately downstream of the second catalyst of about 0.1 cm/s to about 1 m/s.

Clause 7. The method of Clause 1, wherein the hydrocarbon has present water and oxygen, individually, at 10 ppm or less.

Clause 8. The method of Clause 1, wherein the hydrocarbon contains neither water nor oxygen.

Clause 9. The method of Clause 1, wherein the metal or mixture of metals comprises one or more of: potassium, sodium, selenium, cadmium, zinc, or magnesium.

Clause 10. The method of Clause 1 further comprising: downstream of the catalyst-carbon gel separating hydrogen and unreacted hydrocarbons.

Clause 11. The method of Clause 1 further comprising: mechanically removing solid carbon from the catalyst-carbon gel.

Clause 12. The method of Clause further comprising: cooling the catalyst-carbon gel; and chemically and/or thermally removing the catalyst from the catalyst-carbon gel.

Clause 13. The method of Clause 1, wherein a temperature at the catalyst-carbon gel is at a melting point of the catalyst to 10° C. below a boiling point of the catalyst at a working pressure of the catalyst-carbon gel.

Clause 14. The method of Clause 1, wherein a temperature at the catalyst-carbon gel is about 750° C. to about 1250° C. and a pressure at the catalyst-carbon gel is about 1 bar absolute to about 10 bars absolute.

Clause 15. The method of Clause 1, wherein the hydrocarbon comprises methane.

Clause 16. A method comprising: flowing a hydrocarbon through a catalyst, wherein the catalyst is a metal or mixture of metals that is non-wetting to solid carbon at 1 bar absolute and above a melting point of the metal or mixture of metals; entraining gaseous and/or liquid catalyst with the hydrocarbon; condensing and/or depositing the gaseous and/or liquid catalyst downstream of the catalyst; and pyrolyzing at least a portion of the hydrocarbon; thereby forming a catalyst-carbon gel (e.g., comprising (a) a plurality of catalyst particles at least partially coated with a solid carbon coating and (b) solid carbon not contacting portions of the plurality of catalyst particles and not being part of the solid carbon coating).

Clause 17. The method of Clause 16, wherein steps of the flowing of the hydrocarbon through the catalyst, the entraining of the gaseous and/or liquid catalyst, the condensing and/or depositing of the gaseous and/or liquid catalyst, and the pyrolyzing are occurring simultaneously.

Clause 18. The method of Clause 16, wherein steps of the flowing of the hydrocarbon through the catalyst and the entraining of the gaseous and/or liquid catalyst begin before the condensing and/or depositing of the gaseous and/or liquid catalyst.

Clause 19. The method of Clause 16, wherein the flowing of the hydrocarbon through the catalyst begins before the entraining of the gaseous and/or liquid catalyst.

Clause 20. The method of Clause 16, wherein the pyrolyzing begins before the entraining of the gaseous and/or liquid catalyst.

Clause 21: The method of Clause 16, wherein the catalyst is in a reservoir positioned to receive thermal energy from a heat source.

Clause 22: The method of Clause 16, wherein the catalyst-carbon gel is downstream and separate from the catalyst.

Clause 32: The method of Clause 16, wherein the catalyst-carbon gel and the catalyst are in a same vessel.

Clause 33: The method of Clause 16, wherein the catalyst-carbon gel and the catalyst are in separate vessels.

Clause 34: The method of Clause 16, wherein the hydrocarbon flowing through the catalyst has present water and oxygen, individually, at 10 ppm or less.

Clause 35: The method of Clause 16, wherein when flowing the hydrocarbon through the catalyst neither water nor oxygen are present.

Clause 36: The method of Clause 16, wherein the catalyst is selected from the group consisting of: potassium, sodium, selenium, cadmium, zinc, magnesium, and any combination thereof.

Clause 37: The method of Clause 16 further comprising: downstream of the catalyst-carbon gel separating the gaseous and/or liquid catalyst that does not condense and/or deposit in the catalyst-carbon gel from the hydrogen and unreacted hydrocarbons.

Clause 38: The method of Clause 37 further comprising: recycling the gaseous and/or liquid catalyst separated from the hydrogen to the catalyst.

Clause 39: The method of Clause 16 further comprising: mechanically removing the solid carbon from the catalyst and/or the catalyst-carbon gel.

Clause 40: The method of Clause 16 further comprising: cooling the catalyst and/or the catalyst-carbon gel; and chemically and/or thermally removing the catalyst from the solid carbon.

Clause 41: The method of Clause 16, wherein a temperature of the catalyst is at a melting point of the catalyst to 10° C. below a boiling point of the catalyst at a working pressure of the catalyst.

Clause 42: The method of Clause 16, wherein a temperature at the catalyst-carbon gel is about 750° C. to about 1250° C. and a pressure at the catalyst-carbon gel is about 1 bar absolute to about 10 bars absolute.

Clause 43: The method of Clause 16, wherein the hydrocarbon is flowing into the catalyst at a flow rate sufficient to achieve at a linear velocity immediately downstream of the catalyst of about 0.1 cm/s to about 1 m/s.

Clause 44: The method of Clause 16, wherein the catalyst particles of the catalyst-carbon gel have a D90 of about 10 μm or less.

Clause 45: The method of Clause 16, wherein the catalyst particles of the catalyst-carbon gel have a D10 of about 0.1 μm or more.

Clause 46: The method of Clause 16, wherein the hydrocarbon comprises methane.

Clause 47: The method of Clause 16, wherein a carbon to catalyst mass ratio of the catalyst-carbon gel is about 1:1000 to about 1:1.

Clause 48: The method of Clause 16, wherein a carbon to catalyst volume ratio of the catalyst-carbon gel is about 1:4 to about 2:1.

Clause 49: The method of Clause 16, wherein a porosity of the catalyst-carbon gel is about 30% to about 80%.

Clause 50. A method comprising: flowing a hydrocarbon through a molten catalyst reservoir, wherein a catalyst of the molten catalyst reservoir is a metal or mixture of metals that is non-wetting to solid carbon at 1 bar absolute and 10° C. above a melting point of the metal or mixture of metals; entraining gaseous and/or liquid catalyst with the hydrocarbon; condensing and/or depositing the gaseous and/or liquid catalyst downstream of the molten catalyst reservoir; producing a catalyst-carbon gel comprising (a) a plurality of molten catalyst particles at least partially coated with a solid carbon coating and (b) solid carbon not contacting molten portions of the plurality of molten catalyst particles and not being part of the solid carbon coating; flowing the hydrocarbon through the catalyst-carbon gel; and pyrolyzing at least a portion of the hydrocarbon flowing through the molten catalyst reservoir and at least a portion of the hydrocarbon flowing through the catalyst-carbon gel to produce hydrogen gas.

Clause 51: The method of Clause 50, wherein the molten catalyst reservoir is positioned to receive thermal energy from a heat source.

Clause 52: The method of Clause 50, wherein the catalyst-carbon gel is downstream and separate from the molten catalyst reservoir.

Clause 53: The method of Clause 50, wherein the catalyst-carbon gel and the molten catalyst reservoir are in a same vessel.

Clause 54: The method of Clause 50, wherein the catalyst-carbon gel and the molten catalyst reservoir are in separate vessels.

Clause 55: The method of Clause 50, wherein the hydrocarbon flowing through the molten catalyst reservoir has present water and oxygen, individually, at 10 ppm or less.

Clause 56: The method of Clause 50, wherein when flowing the hydrocarbon through the molten catalyst reservoir neither water nor oxygen are present.

Clause 57: The method of Clause 50, wherein the catalyst is selected from the group consisting of: potassium, sodium, selenium, cadmium, zinc, magnesium, and any combination thereof.

Clause 58: The method of Clause 50 further comprising: downstream of the catalyst-carbon gel separating the gaseous and/or liquid catalyst that does not condense and/or deposit in the catalyst-carbon gel from the hydrogen and unreacted hydrocarbons.

Clause 59: The method of Clause 58 further comprising: recycling the gaseous and/or liquid catalyst separated from the hydrogen to the molten catalyst reservoir.

Clause 60: The method of Clause 50 further comprising: mechanically removing the solid carbon from the molten catalyst reservoir and/or the catalyst-carbon gel.

Clause 61: The method of Clause 50 further comprising: cooling the molten catalyst reservoir and/or the catalyst-carbon gel; and chemically and/or thermally removing the catalyst from the solid carbon.

Clause 62: The method of Clause 50, wherein a temperature of the molten catalyst reservoir is at a melting point of the catalyst to 10° C. below a boiling point of the catalyst at a working pressure of the molten catalyst reservoir.

Clause 63: The method of Clause 50, wherein a temperature at the catalyst-carbon gel is about 750° C. to about 1250° C. and a pressure at the catalyst-carbon gel is about 1 bar absolute to about 10 bars absolute.

Clause 64: The method of Clause 50, wherein the hydrocarbon is flowing into the molten catalyst reservoir at a flow rate sufficient to achieve at a linear velocity immediately downstream of the molten catalyst reservoir of about 0.1 cm/s to about 1 m/s.

Clause 65: The method of Clause 50, wherein the molten catalyst particles of the catalyst-carbon gel have a D90 of about 10 μm or less.

Clause 66: The method of Clause 50, wherein the molten catalyst particles of the catalyst-carbon gel have a D10 of about 0.1 μm or more.

Clause 67: The method of Clause 50, wherein the hydrocarbon comprises methane.

Clause 68: The method of Clause 50, wherein a carbon to catalyst mass ratio of the catalyst-carbon gel is about 1:1000 to about 1:1.

Clause 69: The method of Clause 50, wherein a carbon to catalyst volume ratio of the catalyst-carbon gel is about 1:4 to about 2:1.

Clause 70: The method of Clause 50, wherein a porosity of the catalyst-carbon gel is about 30% to about 80%.

Clause 71: A catalyst-carbon gel comprising: a plurality of catalyst particles at least partially coated with a solid carbon coating; and solid carbon not contacting portions of the plurality of catalyst particles and not being part of the solid carbon coating.

Clause 72: The catalyst-carbon gel of Clause 71, wherein the catalyst particles of the catalyst-carbon gel have a D90 of about 10 μm or less.

Clause 73: The catalyst-carbon gel of Clause 71, wherein the catalyst particles of the catalyst-carbon gel have a D10 of about 0.1 μm or more.

Clause 74: The catalyst-carbon gel of Clause 71, wherein the solid carbon coating of the catalyst-carbon gel is about 1 layer of carbon to about 5000 layers of carbon thick.

Clause 75: The catalyst-carbon gel of Clause 71, wherein a carbon to catalyst mass ratio of the catalyst-carbon gel is about 1:1000 to about 1:1.

Clause 76: The catalyst-carbon gel of Clause 71, wherein a carbon to catalyst volume ratio of the catalyst-carbon gel is about 1:4 to about 2:1.

Clause 77: The catalyst-carbon gel of Clause 71, wherein a porosity of the catalyst-carbon gel is about 30% to about 80%.

To facilitate a better understanding of the embodiments of the present invention, the following examples of preferred or representative embodiments are given. In no way should the following examples be read to limit, or to define, the scope of the invention.

EXAMPLES

Figure 2:
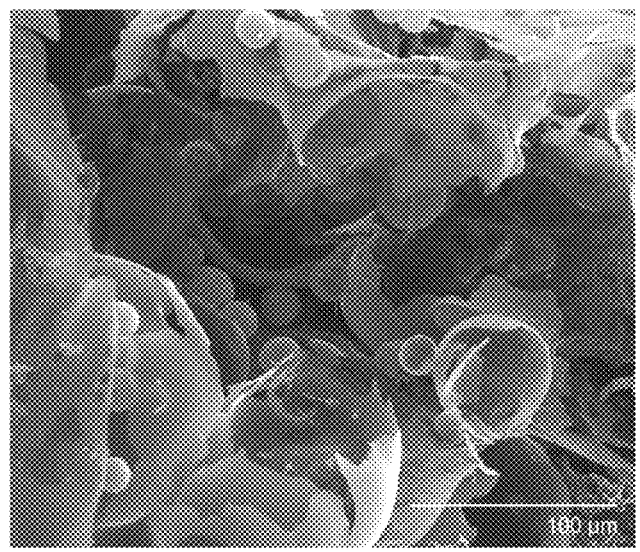
FIG. 2 is an image of the zinc-carbon gel after removal of the zinc.

A zinc catalyst was used for pyrolyzing methane. Methane was bubbled through molten zinc reservoir at a rate of 55 standard cubic centimeter per minute (sccm). About 5 cm downstream, separate from the molten zinc reservoir, and at a lower temperature than the molten zinc reservoir, zinc condensed on the inner walls of the reactor and continued reacting with the methane to form solid carbon that deposited in the same location, thereby forming a zinc-carbon gel. The methane flow was stopped, and the zinc-carbon gel was cooled to room temperature. The cooled zinc-carbon gel was heated at 910° C. for 4 hours to remove solid zinc. The leftover carbon was imaged using scanning electron microscopy. FIG. 2 is an image of the zinc-carbon gel after removal of the zinc. The round carbon shells illustrate that zinc particles at least partially coated in solid carbon were present in the zinc-carbon gel. Further, carbon not associated with zinc particles may be seen in the bottom right corner.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a catalyst-carbon gel; and
flowing a hydrocarbon through the catalyst-carbon gel under conditions sufficient to pyrolyze the hydrocarbon, wherein a catalyst of the catalyst-carbon gel is a metal or mixture of metals that is non-wetting to solid carbon at 1 bar absolute and 10° C. above a melting point of the metal or mixture of metals.

2. The method of claim 1, wherein the catalyst-carbon gel comprises (a) a plurality of catalyst particles at least partially coated with a solid carbon coating and (b) solid carbon not contacting portions of the plurality of catalyst particles and not being part of the solid carbon coating.

3. The method of claim 2, wherein the catalyst particles of the catalyst-carbon gel have a D90 of about 10 μm or less.

4. The method of claim 2, wherein the catalyst particles of the catalyst-carbon gel have a D10 of about 0.1 μm or more.

5. The method of claim 1 further comprising:
flowing the hydrocarbon through a second catalyst comprising the catalyst, wherein the second catalyst is upstream of and separate from the catalyst-carbon gel.

6. The method of claim 5, wherein the hydrocarbon through the second catalyst is at a flow rate sufficient to achieve at a linear velocity immediately downstream of the second catalyst of about 0.1 cm/s to about 1 m/s.

7. The method of claim 1, wherein the hydrocarbon has present water and oxygen, individually, at 10 ppm or less.

8. The method of claim 1, wherein the hydrocarbon contains neither water nor oxygen.

9. The method of claim 1, wherein the metal or mixture of metals comprises one or more of: potassium, sodium, selenium, cadmium, zinc, or magnesium.

10. The method of claim 1 further comprising:
downstream of the catalyst-carbon gel separating hydrogen and unreacted hydrocarbons.

11. The method of claim 1 further comprising:
mechanically removing solid carbon from the catalyst-carbon gel.

12. The method of claim 1 further comprising:
cooling the catalyst-carbon gel; and
chemically and/or thermally removing the catalyst from the catalyst-carbon gel.

13. The method of claim 1, wherein a temperature at the catalyst-carbon gel is at a melting point of the catalyst to 10° C. below a boiling point of the catalyst at a working pressure of the catalyst-carbon gel.

14. The method of claim 1, wherein a temperature at the catalyst-carbon gel is about 750° C. to about 1250° C. and a pressure at the catalyst-carbon gel is about 1bar absolute to about 10 bars absolute.

15. The method of claim 1, wherein the hydrocarbon comprises methane.

* * * * *